(12) United States Patent
Simond

(10) Patent No.: US 6,283,524 B1
(45) Date of Patent: *Sep. 4, 2001

(54) SAFETY HOOK WITH LOCKING LEVER ARTICULATED ON THE LOCKING FINGER

(75) Inventor: Ludger Simond, Les Houches (FR)

(73) Assignee: Etablissements Ludger Simond société anonyme, Chamonix Mont Blanc (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,524

(22) Filed: Aug. 6, 1999

(30) Foreign Application Priority Data

Aug. 13, 1998 (FR) .................................................. 98 10493

(51) Int. Cl.$^7$ ............................... B66C 1/36; F16B 45/02
(52) U.S. Cl. ......................................... 294/82.2; 24/600.1
(58) Field of Search ............................... 294/82.19, 82.2, 294/82.21, 82.33, 82.34; 24/599.1, 599.4–599.9, 600.1, 600.2, 601.5

(56) References Cited

U.S. PATENT DOCUMENTS

| 1,682,617 | * | 8/1928 | Jensen et al. | 294/82.2 |
| 1,747,128 | * | 2/1930 | O'Bannon | 294/82.2 |
| 1,879,168 | * | 9/1932 | Freysinger | 24/600.1 |
| 1,985,596 | * | 12/1934 | Burnham | 24/599.5 X |
| 3,831,994 | * | 8/1974 | Martin | 294/82.21 |
| 4,062,092 | * | 12/1977 | Tamada et al. | 24/599.4 |
| 4,546,523 | * | 10/1985 | Bailey | 24/599.4 |
| 4,621,851 | | 11/1986 | Bailey, Jr. . | |
| 5,257,441 | * | 11/1993 | Barlow | 24/599.5 |
| 5,579,564 | * | 12/1996 | Rullo et al. | 24/599.5 |
| 5,735,025 | * | 4/1998 | Bailey | 24/600.1 |
| 5,896,630 | * | 4/1999 | Smith et al. | 24/600.1 |

FOREIGN PATENT DOCUMENTS

| 2439330 | | 5/1980 | (FR) . | |
| 2485658 | | 12/1981 | (FR) . | |
| 2520712 | * | 8/1983 | (FR) | 294/82.2 |

OTHER PUBLICATIONS

Patent Abstracts of Japan, vol. 095, No. 005, Jun. 30, 1995 Japanese Patent Document 07 031687 Feb. 3, 1995.

* cited by examiner

Primary Examiner—Johnny D. Cherry
(74) Attorney, Agent, or Firm—William H. Eilberg

(57) ABSTRACT

A safety hook in accordance with the invention comprises a body closed by a pivoting finger which can be prevented from rotating by a transverse locking lever. The locking lever is articulated on a lever pivot on the pivoting finger and has a notch engaging over a front lug of the body in the locked position, into which it is biased by a spring. This assures reliable locking by means of a locking lever that is easy to manipulate.

8 Claims, 9 Drawing Sheets

SAFETY HOOK WITH LOCKING LEVER ARTICULATED ON THE LOCKING FINGER

BACKGROUND OF THE INVENTION

1. Field of the Invention

The present invention concerns safety hooks with an open body and a pivoting closure finger, in which locking is assured by a transverse locking lever engaging between the pivoting closure finger and an opposite portion of the safety hook body to selectively prevent pivoting of the locking finger in the opening direction.

2. Description of the Prior Art

Safety hooks of the above kind that are locked automatically by a transverse lever are described amongst others in documents FR 2 439 330 A, FR 2 485 658 A and U.S. Pat. No. 4,621,851 A.

In the above documents, the safety hook comprises a safety hook body having an opening selectively closed by a pivoting finger articulated at its first end about a transverse rotation pivot, with a transverse locking lever mounted to be able to pivot about a lever pivot between a locking position, in which it is engaged between the pivoting finger and an opposite portion of the body to prevent rotation of the pivoting finger and toward which it is biased by spring means, and an unlocked position, in which it releases the pivoting finger so that it can rotate in the opening direction. In documents FR 2 439 330 A and FR 2 485 658 A the pivot of the locking lever is in said opposite portion of the body, and the free end of the locking lever engages over the pivoting finger. In document U.S. Pat. No. 4,621,851 A, the pivot of the locking lever is at the free end of the pivoting finger, and the free end of the locking lever engages against the opposite portion of the body.

In documents FR 2 485 658 A and U.S. Pat. No. 4,621,851 A, the locking lever is generally rectilinear, entirely engaged between the pivoting finger and the opposite portion of the body, near the free end of the pivoting finger. As a result, the locking lever reduces the opening capacity of the safety hook, and constitutes a component that is relatively inconvenient to operate, necessitating the use of the thumb to press it perpendicularly to the movement of the pivoting finger in the opening direction. This device is therefore not suitable for mountaineering use or for working in high places, where safety conditions must be complied with without necessitating difficult and irksome intervention by the user. What is more, there is nothing to prevent pivoting of the locking lever, which can therefore be unlocked unintentionally.

In document FR 2 439 330 A, the transverse locking lever is at a greater distance from the free end of the pivoting finger, which improves the opening capacities. Also, the locking lever is L-shaped with a longitudinal branch that projects radially beyond the opposite portion of the body, which makes the locking lever more accessible for manipulation. However, locking is not sufficiently reliable because it is assured by two parallel branches at the end of the locking lever which constitute relatively weak components that may be deformed and spread apart in use. Also, the operator must be sure to press on the locking lever before pressing on the locking finger to open it, failing which it is impossible to pivot the locking lever. What is more, the locking lever projects away from the body in an exaggerated manner, and constitutes a protruding component that can interfere with use and to which force can be applied unintentionally.

In the above document, a sliding ring, mounted on the opposite portion of the body, can immobilize the locking lever to prevent it from pivoting toward the unlocked position. The drawback of this is that it is therefore necessary to manipulate the locking ring each time so that the locking lever can then be manipulated to unlock the safety hook.

Document JP 07 031 687 A describes a safety hook in which a generally rectilinear transverse locking lever is articulated at a first end on a lever pivot at an intermediate position on the pivoting finger, and cooperates via lateral L-shaped slots in its second end with opposite lateral bearing lugs of the body of the safety hook. A manipulator lever, separate from the locking lever, is articulated on the opposite part of the body and pushes the free end of the locking lever laterally to unlock the safety hook by rotating the locking lever. The structure is more complex and costly, and has an increased risk of jamming in the event of accidental ingress of sand or mud between the many moving parts or into the L-shaped slots. With this safety hook the operator must also be sure to press the manipulator lever before pressing the pivoting locking finger to open it, failing which it is impossible or very difficult to pivot the locking lever. This complicates operation. Furthermore, there is nothing to prevent pivoting of the locking lever, which may become unlocked unintentionally.

The problem addressed by the present invention is that of designing a new hook structure which is locked automatically by a transverse locking lever, which assures both reliable and effective locking, a maximum opening capacity of the safety hook, and great ease of use to change from the closed and locked position to the open and unlocked position.

The invention equally aims to design a safety hook structure of the above kind that is particularly simple and inexpensive to manufacture.

Optionally, the structure of the safety hook in accordance with the invention must assure selective immobilization or permanent releasing of the locking lever, enabling the user to choose between single locking or double locking.

SUMMARY OF THE INVENTION

To achieve the above and other objects, the invention consists in a safety hook which locks automatically including a safety hook body having an opening, a pivoting finger adapted to close the opening and articulated at its first end about a transverse rotation pivot, and a transverse locking lever having a first end adapted to pivot about a lever pivot in an intermediate position on the pivoting finger, wherein the locking lever has an engaging portion conformed to cooperate with a corresponding bearing area in an opposite portion of the body; the locking lever is adapted to pivot between a locked position, into which it is biased by a locking spring and in which it is engaged between the pivoting finger and the corresponding bearing area to prevent rotation of the pivoting finger, and an unlocked position, in which the engaging portion escapes from the corresponding bearing area to allow the pivoting finger to pivot in its opening direction; the locking lever is generally L-shaped with a transverse locking branch extending between the lever pivot and the engaging portion of the lever, and with a longitudinal manipulator branch projecting radially beyond the opposite portion of the body and extending longitudinally along the body from the engaging portion of the lever.

The engaging part of the locking lever is therefore in an intermediate position between the longitudinal manipulator branch and the transverse locking branch.

In a first embodiment, the engaging portion and the bearing area are such that, when it pivots in its unlocking direction, the locking lever pivots in the opposite direction to that in which the pivoting finger rotates in its opening direction.

In a variant, the engaging portion and the bearing area are such that, when it rotates in its unlocking direction, the locking lever pivots in the same direction as that in which the pivoting finger rotates in its opening direction.

To facilitate manipulation of the locking lever, the pivoting finger is biased toward its closed position by a dedicated return spring, distinct from the locking spring, and the stiffness of the locking spring is less than or equal to a limit value for which equal forces F2 and F1 respectively applied to the pivoting finger and the locking lever cause simultaneous rotation of the pivoting finger and the locking lever opposite the respective springs.

Other objects, features and advantages of the present invention will emerge from the following description of particular embodiments, given with reference to the accompanying drawings.

DETAILED DESCRIPTION OF THE PREFERRED EMBODIMENTS

Figure 1:
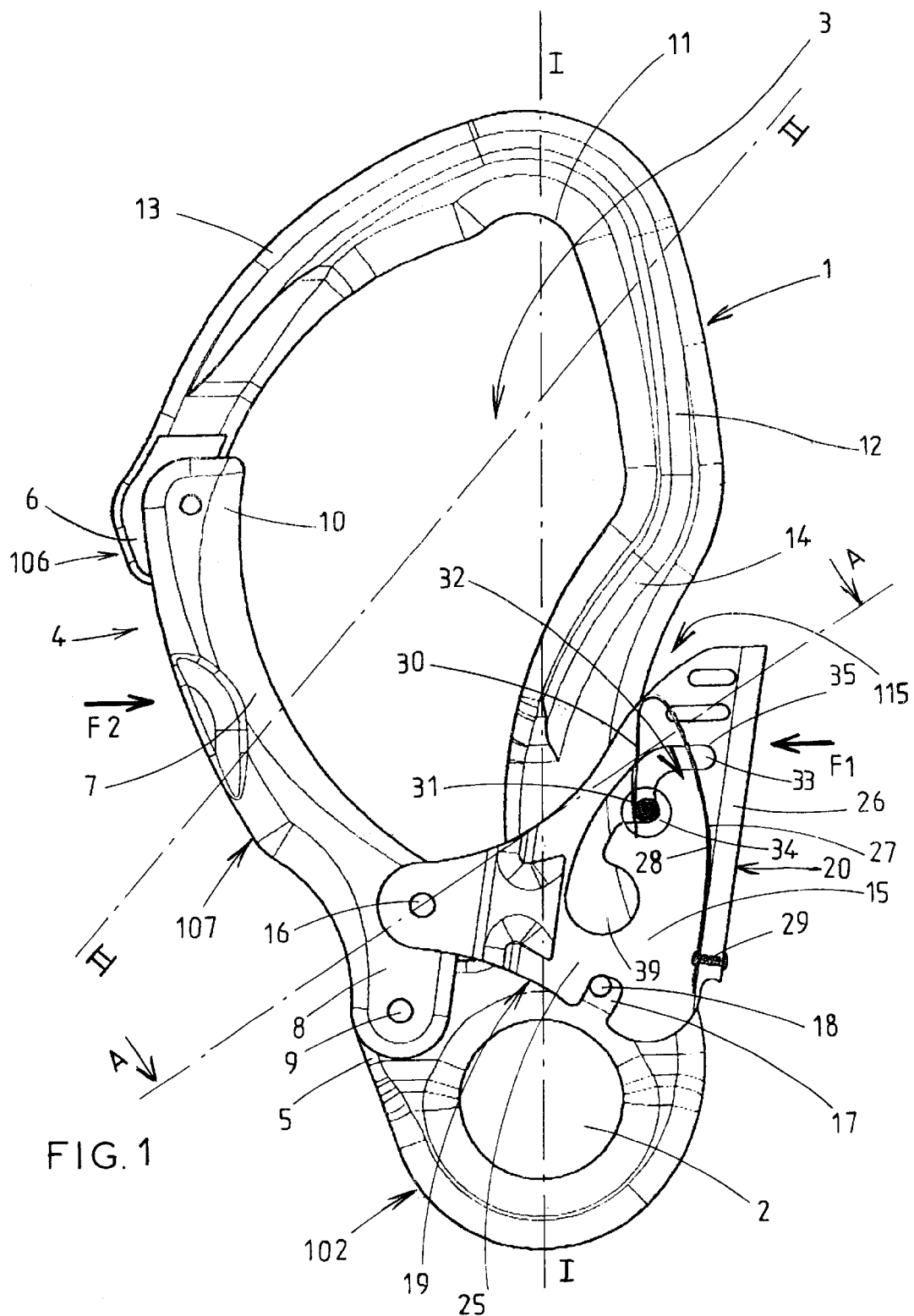
FIG. 1 is a front view of a first embodiment of a safety hook in accordance with the present invention, closed and locked, with the locking lever immobilized.

In both embodiments shown in the figures, a safety hook in accordance with the invention which locks automatically comprises a safety hook body 1 having a closed first loop 2 and an opening second loop 3. The opening loop 3 comprises an opening 4 delimited by a first end 5 and a second end 6 of the body. The opening 4 is selectively closed by a pivoting finger 7 articulated at its first end 8 to the first end 5 of the body about a transverse rotation pivot 9, and biased to rotate toward its closed position by a return spring that is not shown in the figures. In the closed position shown in FIG. 1, the second end 10 of the pivoting finger 7 engages over the second end 6 of the body.

In the embodiments shown, the safety hook has a particular and advantageous shape. Thus, considering the longitudinal axis I—I of the safety hook, joining the center of the closed first loop 2 and the top 11 of the opening second loop 3, the body 1 comprises a longitudinal branch 12 generally parallel to and relatively close to the axis I—I, whereas the pivoting finger 7 and the corresponding oblique second branch 13 of the body 1 diverge from the longitudinal axis I—I. From the top 11, the oblique second branch 13 extends obliquely to the second end 6 of the body. The longitudinal branch 12 of the body 1 has at its base an oblique portion 14 which converges progressively with the longitudinal axis I—I to form an external recess 115 in the portion of the body 1 opposite the pivoting finger 7.

Figure 5:
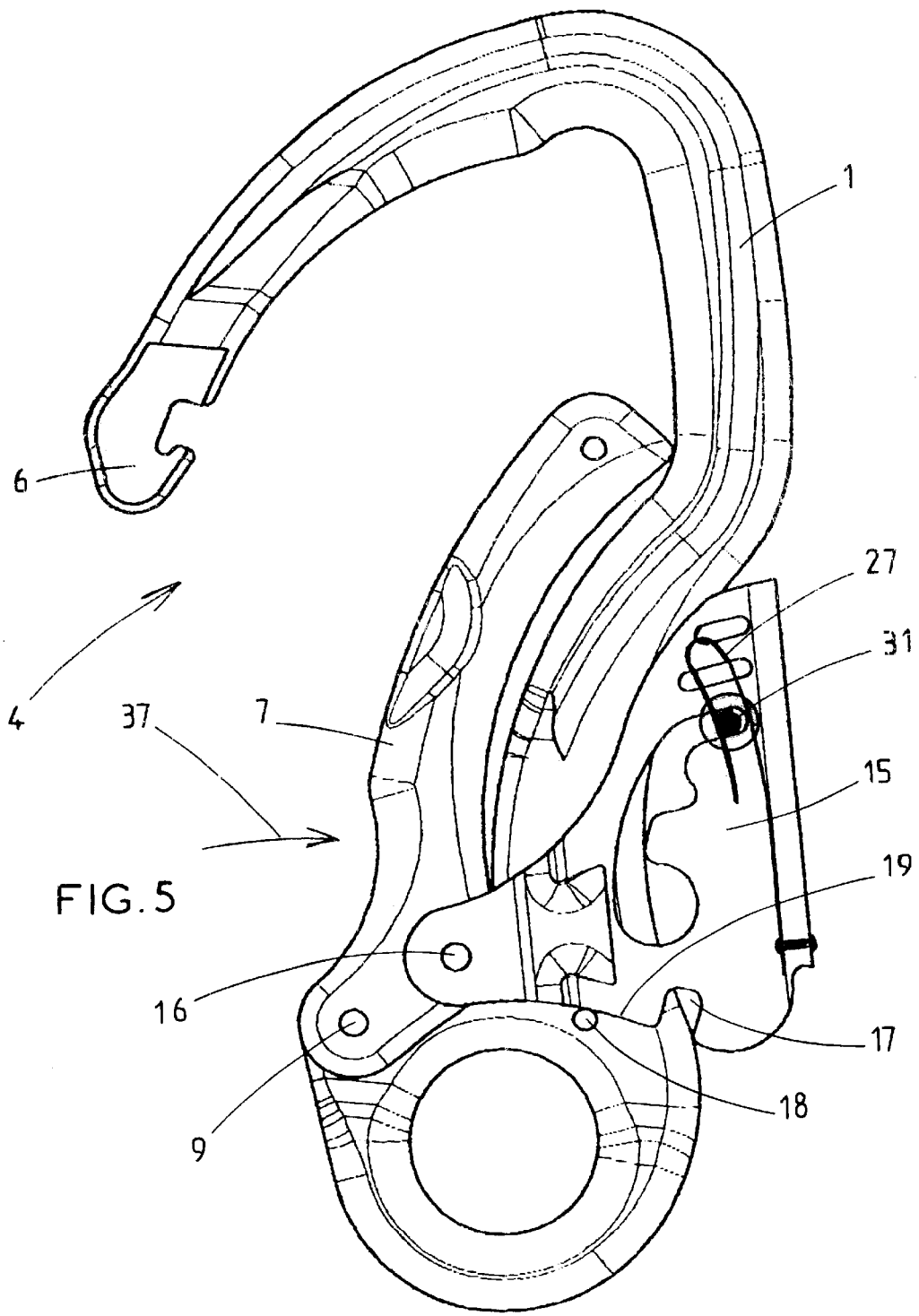
FIG. 5 is a front view of the safety hook from FIG. 1 open.
Figure 9:
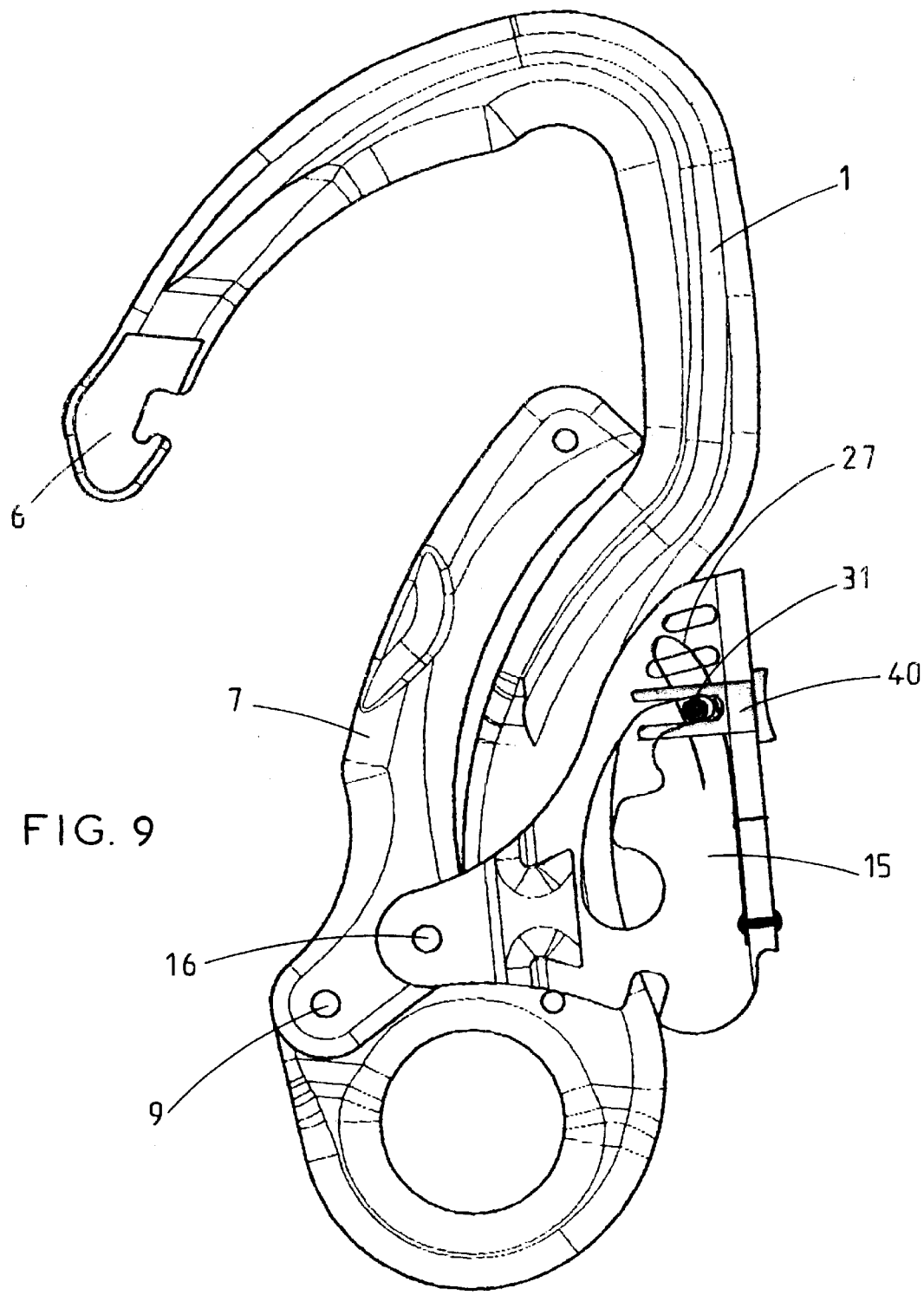
FIG. 9 is a front view of the safety hook from FIG. 6 open.

Because of the oblique second branch 13 and the oblique portion 14 of the body 1, the opening second loop 3 is elongate along an oblique axis II—II with a back of the opening second loop 3 constituted by the top 11 and the longitudinal branch 12 of the body, the back being opposite the opening 4 closed by the pivoting finger 7. When the pivoting finger 7 is open, as shown in FIG. 5 or FIG. 9, the pivoting finger 7 bears against the oblique portion 14 of the body 1, and in this way frees a large space within the opening second loop 3. The safety hook then constitutes a wide open hook which is very easy to fit to an anchor member such as a bar, a ring, a cable, a rope.

The oblique portion 14 and the pivoting finger 7 are advantageously curved as shown in the figures. However, the radially outermost portion 107 of the pivoting finger 7 is set back from the line joining the farthest-projecting areas 106 and 102 of the body 1 on either side of the pivoting finger 7. The pivoting finger 7 is therefore not rotated if the two protruding areas 106 and 102 of the safety hook are in contact with a plane surface.

The pivoting finger 7 can advantageously have an oppositely curved portion near its articulated end, with the concave side facing outward.

The safety hook in accordance with the invention further comprises a transverse locking lever 15 having a first end mounted to pivot about a lever pivot 16 at an intermediate position on the pivoting finger 7. In the advantageous embodiment shown, the lever pivot 16 is nearer the first end 8 than the second end 10 of the pivoting finger 7, for example about one fifth of the length of the pivoting finger 7 from the first end 8 of the pivoting finger 7.

The possibility of an oppositely curved portion of the pivoting finger, between the transverse rotation pivot 9 and the lever pivot 16, has the advantage of making it possible to offset the lever pivot 16 toward the inside of the safety hook, in the direction of the opposite portion of the body 1, reducing the travel and the force needed to unlock the safety hook.

The locking lever 15 has an engaging part 17 for co-operating with a corresponding bearing area 18 in a portion of the body 1 opposite the pivoting finger 7.

In the embodiment shown in the figures, the engaging part 17 comprises at least one notch formed in an external ramp consisting of the bottom edge 19 of the locking lever, and the bearing area 18 of the body 1 comprises at least one front lug projecting from the body 1 parallel to the lever pivot 16. The bottom edge 19 of the locking lever 15 is generally perpendicular to the longitudinal axis I—I of the safety hook, while the notch 17 constituting the engaging part is generally longitudinal, that is to say parallel to the longitudinal axis I—I. In the locked position shown in FIG. 1, the front lug 18 engaged in the notch 17 prevents movement of the locking lever 15 toward the right, and thus locks the safety hook by opposing pivoting of the pivoting finger 7, which is held in the closed position.

Thus, in the locked position, the engaging part 17 and the corresponding bearing area 18 of the body 1 oppose transverse movement of the locking lever 15 and the pivoting finger 7.

Figure 4:
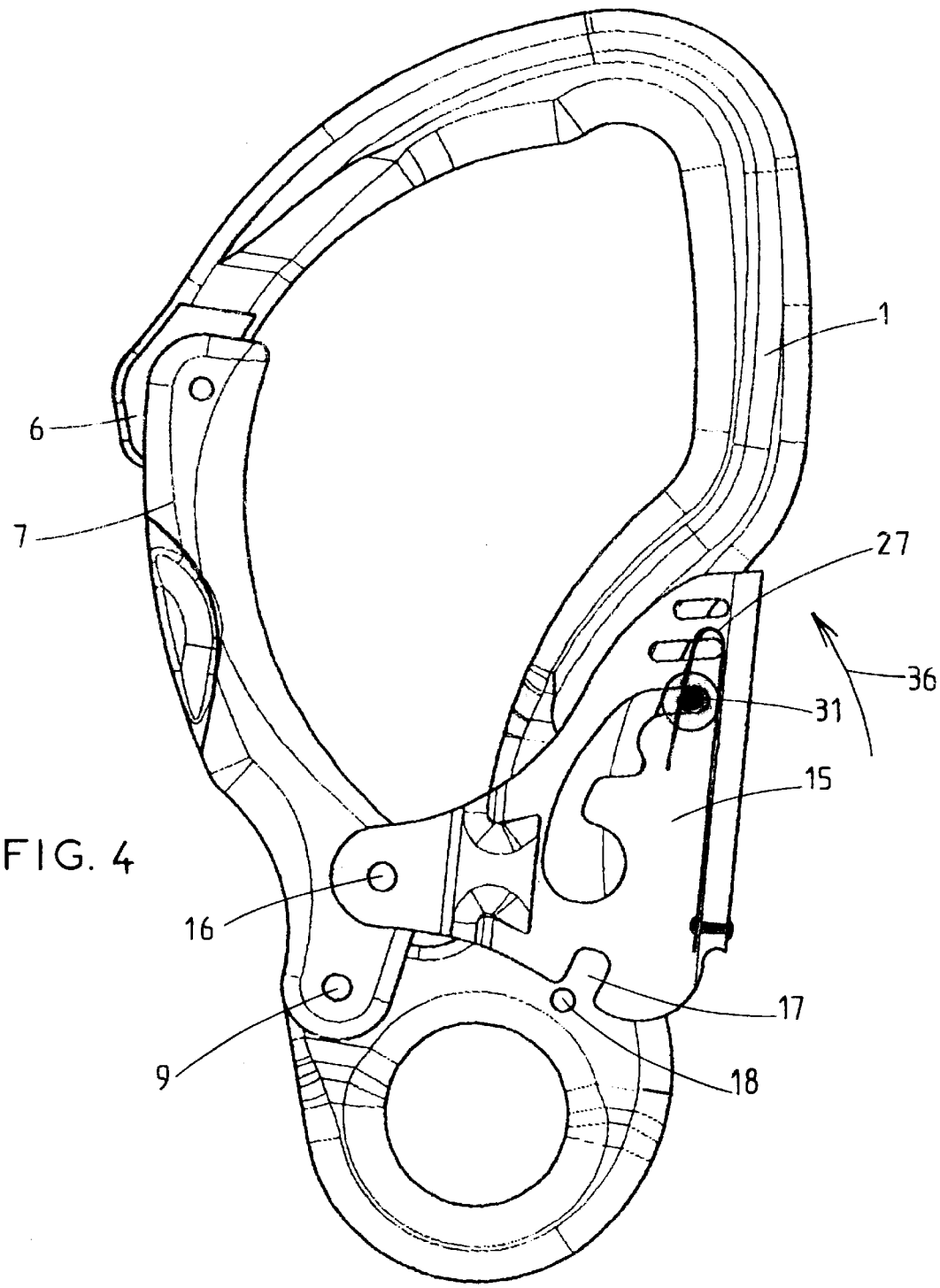
FIG. 4 is a front view of the safety hook from FIG. 1 closed and unlocked.

In the unlocked position shown in FIG. 4, the locking lever 15 has pivoted, and the engaging part 17 or notch has escaped from the bearing area 18 or front lug of the body 1 to allow transverse movement of the locking lever 15 and to allow the pivoting finger 7 to pivot in the opening direction.

Figure 2:
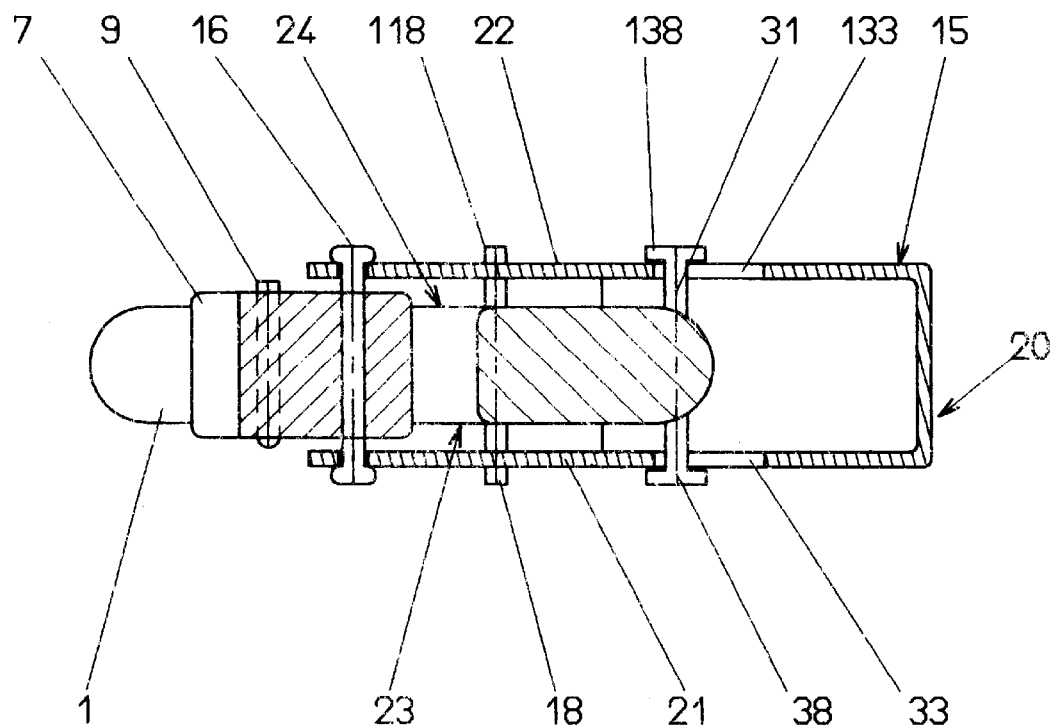
FIG. 2 is a plan view in section taken along the line A—A in FIG. 1.

As shown in FIG. 2, the locking lever 15 in this embodiment is a plate bent to a U-shape forming two parallel branches 21 and 22 respectively connected by a bearing wall 20. The branch 21 faces the front face 23 of the body 1, while the branch 22 faces the rear face 24 of the body 1. The free ends of the branches 21 and 22 are joined by the lever pivot 16 which allows the locking lever 15 to pivot but prevents any risk of the branches 21 and 22 moving apart.

As shown in FIG. 1, in which it is seen from the front, the locking lever 15 is generally L-shaped with a transverse locking branch 25 between the lever pivot 16 and the engaging part 17, and with a longitudinal manipulator branch 26 substantially perpendicular to the transverse locking branch 25 and projecting radially beyond the opposite portion of the body 1, although it preferably remains within the external recess 115 to avoid it protruding in an exaggerated fashion. The longitudinal manipulator branch 26 is extended longitudinally along the body 1 from the engaging portion 17 of the lever, for example toward the top 11 of the body 1 of the safety hook beyond the transverse area of the safety hook containing the lever pivot 16. The bearing wall 20 is extended by the longitudinal manipulator branch 26 to constitute a more comfortable bear for the user, who has to depress the bearing wall 20 to pivot the locking lever 15 between the locked position (FIG. 1) and the unlocked position (FIG. 4). Also, because of the intermediate position of the engaging portion 17, between the transverse locking branch 25 and the longitudinal manipulator branch 26, the force required to unlock the safety hook is significantly reduced.

In the embodiment shown, because of the position of the engaging part 17 in the form of a notch in the bottom edge 19 of the locking lever 15, when it rotates in the unlocking direction, the locking lever 15 pivots in the direction opposite the rotation of the pivoting finger 7 in the opening direction: as shown in FIG. 1, to unlock the safety hook, the locking lever 15 pivots anti-clockwise, while to open the hook, the pivoting finger 7 pivots clockwise. As a result, to unlock the safety hook, the user applies a force F1 to the bearing wall 20 of the locking lever 15 in a direction radially toward the center of the safety hook. At the same time, or slightly afterwards, the user applies to the pivoting finger 7 a force F2, also radially toward the center of the safety hook but in the opposite direction to the force F1, to move the pivoting finger 7 to the open position. This makes it very easy to unlock and open the safety hook by the user simultaneously applying pressure to generate the forces F1 and F2.

Alternatively, the engaging part 17 could have a different shape, for example it could be a slot in the locking lever 15, in which case unlocking the safety hook would imply rotating the locking lever 15 clockwise in the outward direction, to unlock the safety hook by rotating the locking lever 15 in the same direction as the rotation that opens the pivoting finger 7.

Referring again to FIG. 2, it can be seen that the bearing area of the body is in reality provided by a front first lug 18, and by a corresponding rear second lug 118. The front lug 18 cooperates with a notch 17 as shown in FIG. 1, while the rear lug 118 cooperates with a similar notch formed in the second branch 22 of the locking lever 15 (not shown in the figure).

FIG. 1 also shows a spring 27 engaged between the locking lever 15 and the body 1 to bias the locking lever 15 into the locked position in which the notch 17 is in bearing engagement with the front lug 18.

In the embodiment shown, the locking spring 27 is a curved flexible leaf spring with a first end of a first branch 28 fixed to the locking lever 15 in a fixing area 29 and its second end bears against the outside face of the longitudinal branch 12 of the body 1 and is bent so that it connects to a second branch 30 generally parallel to the first branch 28. The first branch 28 of the locking spring 27 is therefore functionally engaged between the body 1 and the locking lever 15 to push the locking lever 15 toward its locked position.

The stiffness of the locking spring 27 is advantageously less than or equal to a limit value for which equal forces F2 and F1 respectively applied to the pivoting finger 7 and to the locking lever 15 cause simultaneous rotation of the pivoting finger 7 and the locking lever 15 against respective springs. In other words, the return torque applied to the locking lever 15 by the locking spring 27 must be less than or equal to the opposite torque applied to the same locking lever 15 by the force F1, which is equal to the force F2 which starts the pivoting finger rotating in the opening direction against its return spring.

In the embodiments shown, the safety hook further comprises immobilizing means for selectively immobilizing the locking lever 15 against rotation and preventing unlocking of the safety hook.

Figure 3:
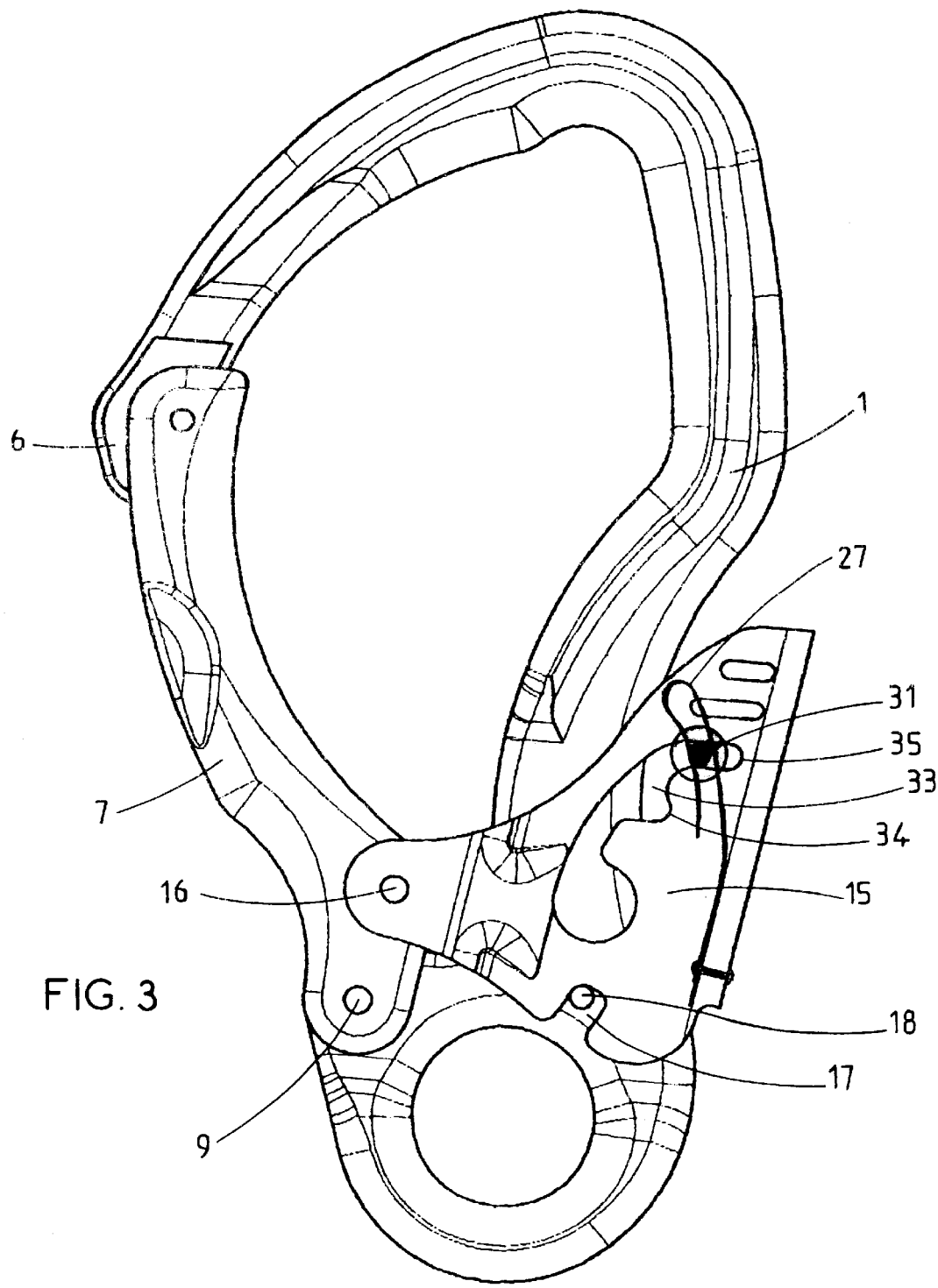
FIG. 3 is a front view of the safety hook from FIG. 1 closed and locked with the locking lever released.

In the figures, the immobilizing means comprise a mobile abutment 31, mounted on the locking lever 15, and movable on guides 32 between an immobilizing position, shown in FIG. 1, in which the mobile abutment 31 bears against a portion of the body 1 to oppose pivoting of the locking lever 15, and a release position shown in FIG. 3, in which the mobile abutment 31 is moved away from the portion of the body 1 to authorize unlocking pivoting of the locking lever 15.

The mobile abutment 31 is a front-to-back pin mounted to slide in two lateral slots 33 and 133 (FIG. 2) forming the guides 32. Each slot, for instance the lateral slot 33, has a shallow first notch 34 in which the mobile abutment 31 is engaged in the immobilizing position, and a deeper second notch 35 in which the mobile abutment 31 can engage in the release position. The notches 34, 35 extend in a generally radial direction away from the body 1.

The second branch 30 of the spring 27 is functionally engaged between the body 1 and the mobile abutment 31 to push the mobile abutment 31 away from the body 1, either into the bottom of the first notch 34 or toward the bottom of the second notch 35.

How the safety hook works will now be explained with reference to FIGS. 1 to 5.

In the closed, locked and immobilized configuration shown in FIG. 1, the mobile abutment 31 is engaged in the first notch 34 of the lateral slot 33, into which it is pushed by the spring 27. In this first notch 34, the mobile abutment 31 is in the immediate vicinity of the lateral face of the body 1, preventing rotation of the locking lever 15 in the clockwise direction.

In FIG. 3, the mobile abutment 31 has moved into the second notch of the lateral slot 33. The mobile abutment 31 is then away from the body 1, and allows the locking lever 15 to rotate counterclockwise. The locking lever 15 remains in the locked position, however, into which it is biased by the spring 27, preventing pivoting of the pivoting finger 7.

FIG. 4 shows the safety hook unlocked and closed: the user has pivoted the locking lever 15 in the unlocking direction 36 about its lever pivot 16, against the return force exerted by the spring 27, moving the notch 17 away from the front lug 18. The pivoting finger 7 remains in the closed position, however, into which it is biased by a return spring that is not shown in the figures.

In FIG. 5, the user has pivoted the pivoting finger 7 to its open position, in the direction of the arrow 37 and about its transverse rotation pivot 9, freeing the opening 4. During this movement, the front lug 18 can slide on the ramp consisting of the bottom edge 19 of the locking lever 15.

In the embodiment shown in FIGS. 1 to 5, and as seen best in FIG. 2, the mobile abutment 31 is a front-to-back pin with two heads 38 and 138 at its ends which are wider than the portion of the lateral slot 33 including the notches 34 and 35. An end portion 39 of the lateral slot 33 is widened for the end heads 38 and 138 to pass through during assembly. The end heads 38 and 138 constitute the manipulator member which the user employs to move the mobile abutment 31 between the immobilizing position and the release position.

Figure 6:
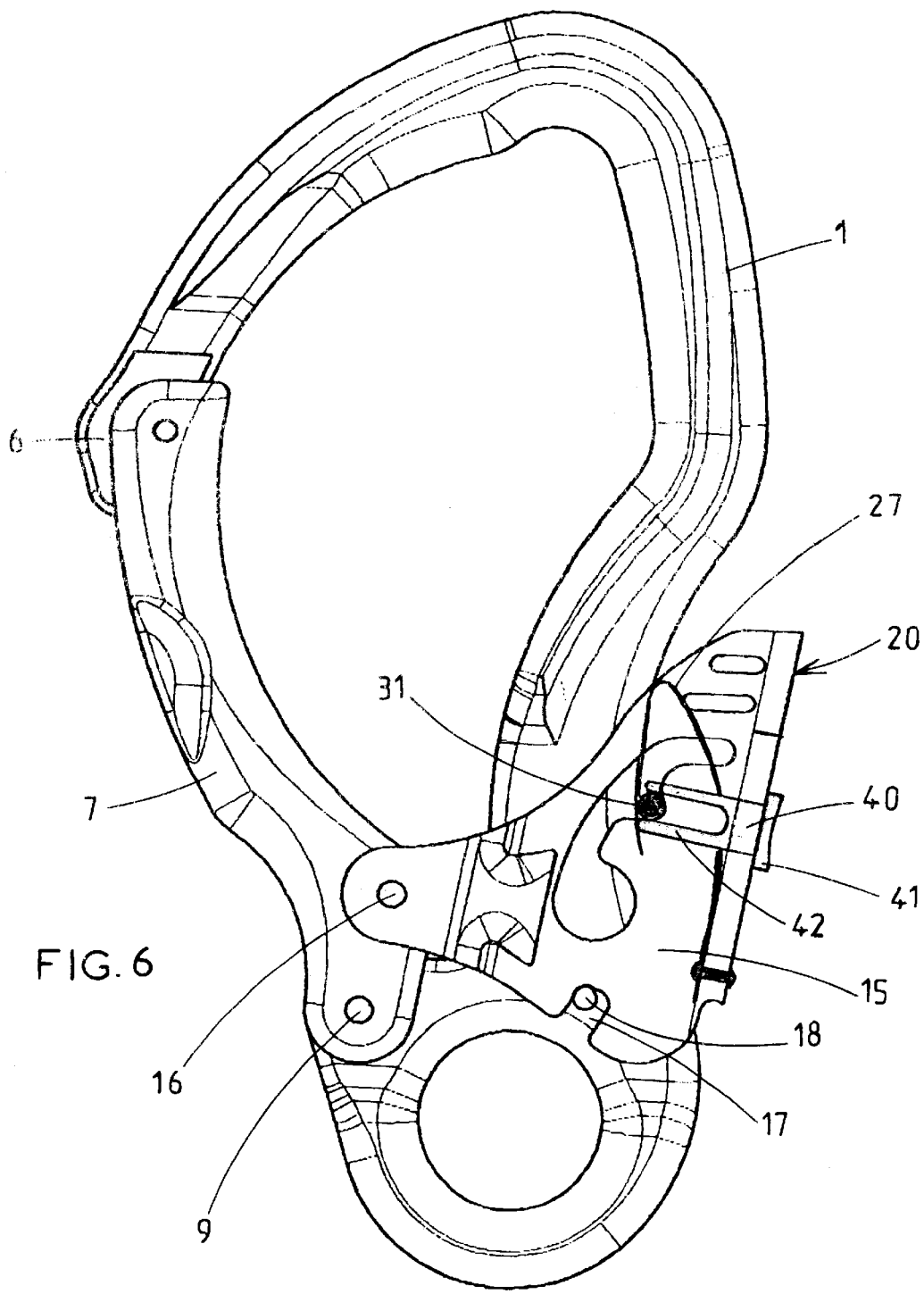
FIG. 6 is a front view of a second embodiment of a safety hook in accordance with the present invention, closed and locked with the locking lever immobilized.
Figure 7:
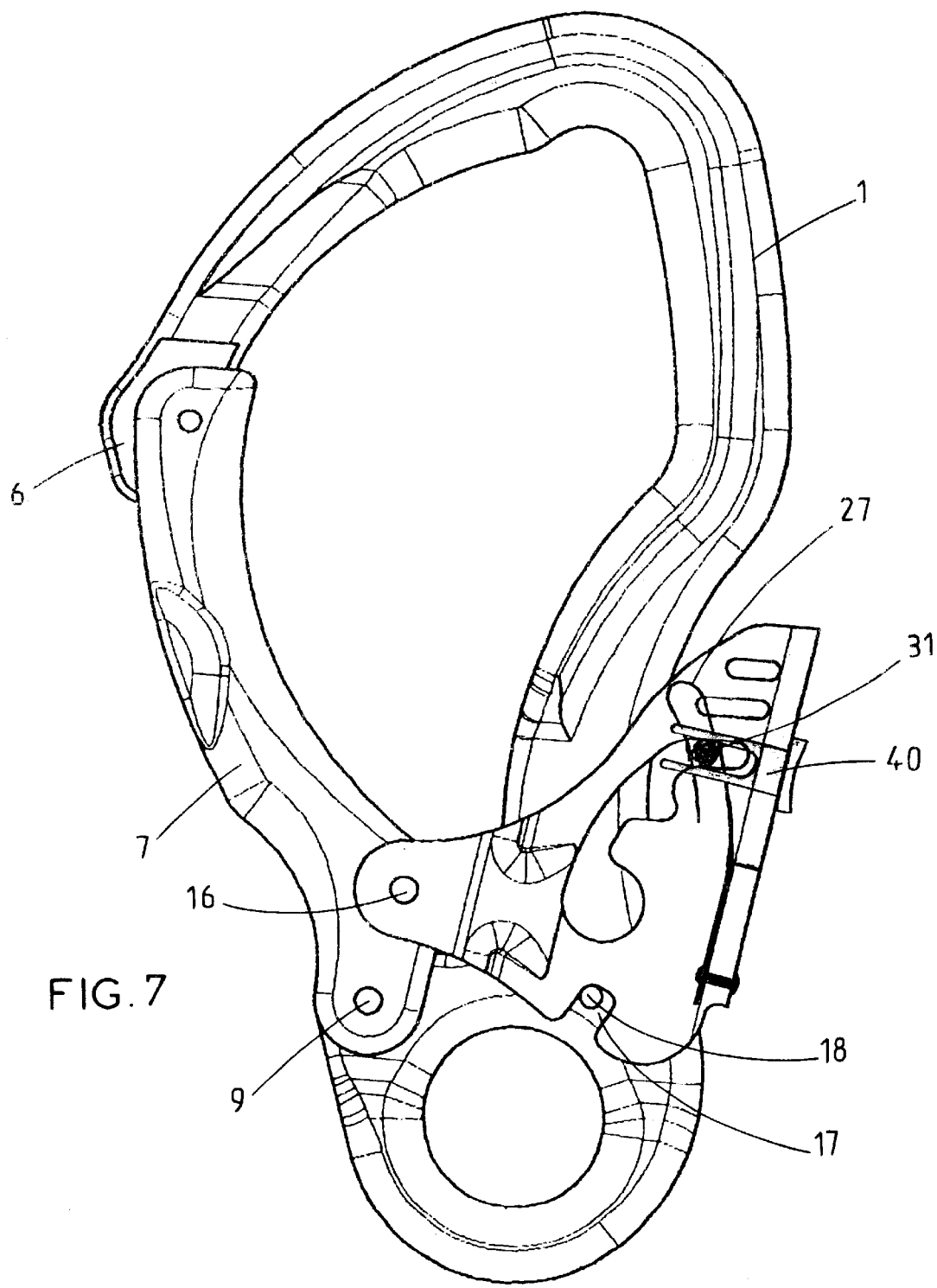
FIG. 7 is a front view of the safety hook from FIG. 6 closed and locked with the locking lever released.
Figure 8:
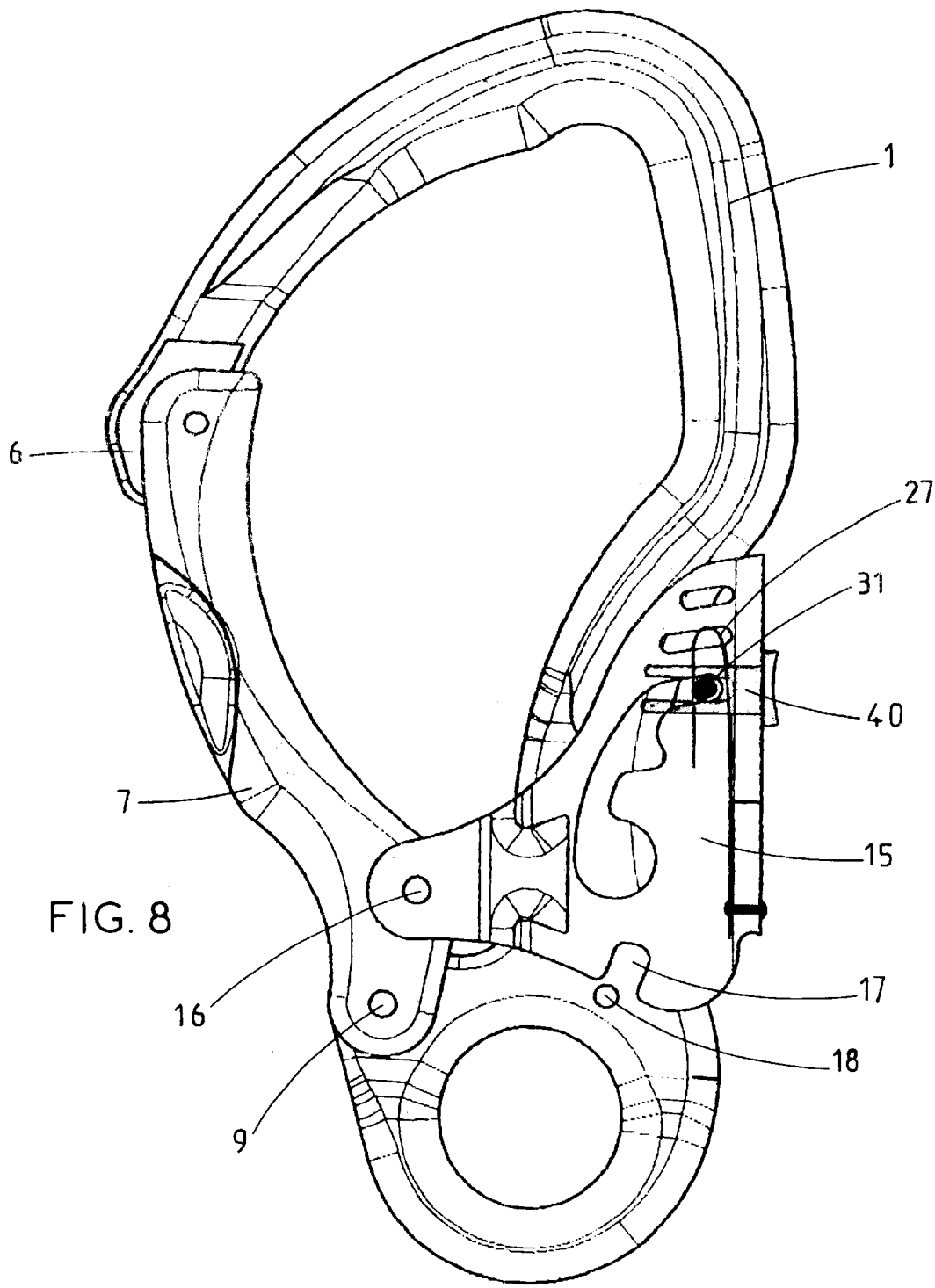
FIG. 8 is a front view of the safety hook from FIG. 6 closed and unlocked.

In the embodiment shown in FIGS. 6 to 9, the mobile abutment 31 is moved between the immobilizing position shown in FIG. 6 and the release position shown in FIGS. 7 to 9 by a slider 40 having a head 41 extending to the outside of the bearing wall 20 of the locking lever 15, and having a fork 42 engaged on either side of the front-to-back pin forming the mobile abutment 31. The slider 40 slides longitudinally in a longitudinal slot formed in the bearing wall 20 of the locking lever 15, between the immobilizing position shown in FIG. 6 and the release position shown in FIGS. 7 to 9.

Otherwise, the safety hook shown in FIGS. 6 to 9 comprises the same components as the hook shown in FIGS. 1 to 5, and works in exactly the same manner, as shown in the figures.

The present invention is not limited to the embodiments explicitly described, but includes variants and generalizations thereof within the scope of the following claims.

What is claimed is:

1. A safety hook which locks automatically including a safety hook body having an opening, a pivoting finger having a length sufficient to close said opening, the pivoting finger having a first end, the pivoting finger being articulated at said first end about a transverse rotation pivot, and a transverse locking lever having a first end which pivots about a lever pivot in an intermediate position on said pivoting finger, wherein said locking lever has an engaging portion which cooperates with a corresponding bearing area in a portion of said body which is opposite said pivoting finger, the locking lever is adapted to pivot between a locked position, into which it is biased by a locking spring and in which it is engaged between said pivoting finger and the corresponding bearing area to prevent rotation of said pivoting finger, and an unlocked position, in which said engaging portion escapes from the corresponding bearing area to allow said pivoting finger to pivot in its opening direction, the locking lever is generally L-shaped with a transverse locking branch extending between said lever pivot and said engaging portion of said lever, and a longitudinal manipulator branch projecting radially beyond said opposite portion of said body and extending longitudinally along said body from said engaging portion of said lever.

2. The safety hook claimed in claim 1 wherein said engaging portion and said bearing area are such that, when said locking lever pivots in its unlocking direction, said locking lever pivots in the opposite direction to that in which said pivoting finger rotates in its opening direction.

3. The safety hook claimed in claim 1 wherein said bearing area of said safety hook body comprises at least one lug projecting from said body, said engaging portion of said locking lever comprises at least one longitudinal notch in a ramp, said lug engages in said longitudinal notch to lock said safety hook.

4. The safety hook claimed in claim 1 wherein said pivoting finger comprises, between said transverse rotation pivot and said lever pivot, an oppositely curved portion which offsets said lever pivot towards the inside of said safety hook.

5. safety hook as claimed in claim 1 further comprising immobilizing means for selectively preventing rotation of said locking lever and preventing unlocking of said safety hook.

6. The safety hook claimed in claim 5 wherein said immobilizing means comprise a mobile abutment, mounted on said locking lever, and movable on guides between an immobilizing position, in which said mobile abutment bears against a portion of said body to oppose pivoting of said locking lever, and a release position, in which said mobile abutment remains away from said portion of said body to allow said locking lever to pivot in the unlocking direction.

7. A safety hook as claimed in claim 1 comprising an external recess in said portion of said body opposite said pivoting finger, and wherein said longitudinal manipulator branch of said locking lever remains within said external recess of said body.

8. The safety hook claimed in claim 1 wherein said locking lever is a plate bent to a U-shape forming two parallel branches connected by a bearing wall and whose free ends are joined by said lever pivot.

* * * * *